United States Patent [19]
Kikstra

[11] Patent Number: 5,713,786
[45] Date of Patent: Feb. 3, 1998

[54] EVISCERATING DEVICE FOR POULTRY

[75] Inventor: Evert Kikstra, Oostzaan, Netherlands

[73] Assignee: Machinefabriek Meyn B.V., Oostzaan, Netherlands

[21] Appl. No.: 611,118

[22] Filed: Mar. 5, 1996

[30] Foreign Application Priority Data

Mar. 8, 1995 [NL] Netherlands ............... 9500459

[51] Int. Cl.$^6$ ............................................. A22C 21/06
[52] U.S. Cl. ................................. 452/118; 452/117
[58] Field of Search ................................. 452/118, 117, 452/106, 135, 137

[56] References Cited

U.S. PATENT DOCUMENTS

| | | |
|---|---|---|
| 3,798,708 | 3/1974 | Scheier . |
| 3,902,221 | 9/1975 | Hauben, Jr. et al. ............ 452/118 |
| 3,979,793 | 9/1976 | Hazenbroek . |
| 4,262,387 | 4/1981 | Scheier et al. ............ 452/117 |
| 4,435,878 | 3/1984 | Tieleman ............ 452/118 |

*Primary Examiner*—Willis Little
*Attorney, Agent, or Firm*—Dority & Manning

[57] ABSTRACT

The invention relates to an eviscerating device for removing the entrails from slaughtered poultry, comprising a substantially U-shaped brace with two legs extending in the same plane and a brace bottom connecting the legs. The legs and the brace bottom comprise a rod with a smooth surface without projections. At the brace bottom, the rod is shaped such that it comprises, at the crest of the brace bottom, a bend projecting from the plane of the brace legs having a shape adapted to the expected shape of the spine of the poultry to be processed. Thus a good loosening function is combined with a substantially reduced chance of damage to the entrails or poultry.

4 Claims, 2 Drawing Sheets

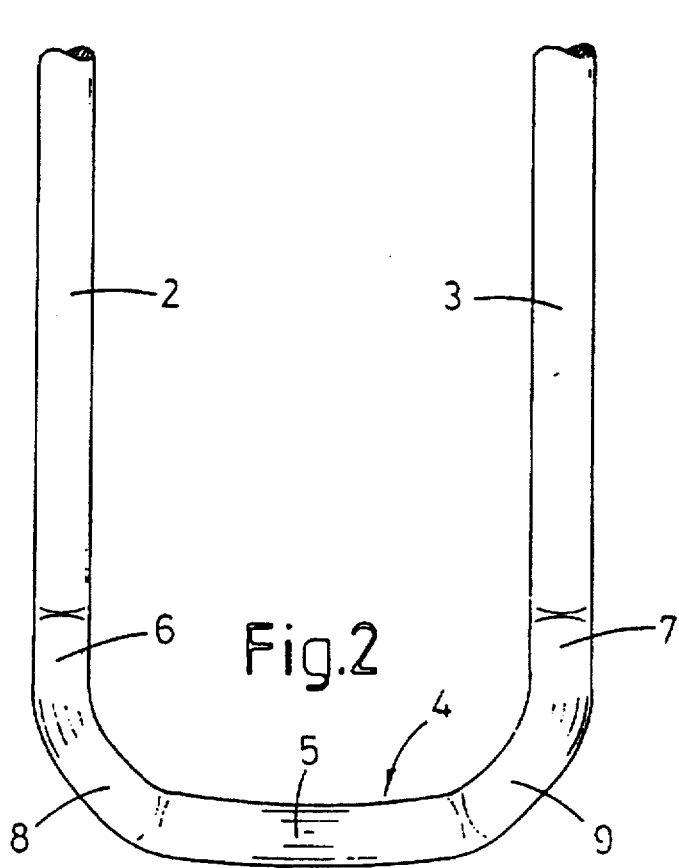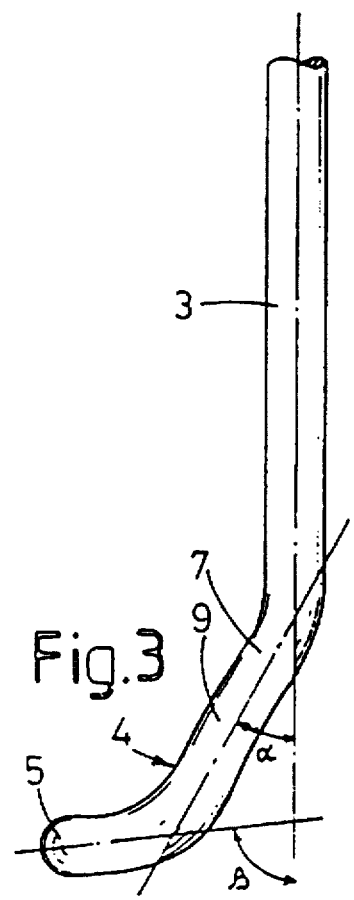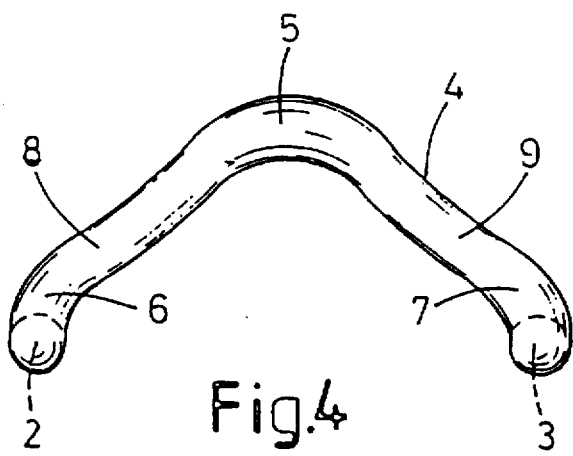

EVISCERATING DEVICE FOR POULTRY

BACKGROUND OF THE INVENTION

The present invention relates to an eviscerating device for removing the entrails from slaughtered poultry, comprising a substantially U-shaped brace with two legs extending in the same plane and a brace bottom connecting the legs.

Such an eviscerating device is known from U.S. Pat. No. 4,262,387, incorporated by reference herein. While eviscerating slaughtered poultry, the eviscerating device is entered into the body cavity through an opening of the poultry being suspended with their legs. Next, the eviscerating device is moved into the internal cavity along the sternum and, after reaching its lowermost position, moved towards the spine. Next the eviscerating device is pulled upwardly out of the internal cavity of the poultry while the brace bottom moves along the spine, such that the entrails are removed from the poultry.

In this eviscerating device, at one side of the brace bottom two projections directed transversely to the brace are applied which engage the spine at both sides while moving the brace out of the poultry, thus gripping veins and arteries which interconnect the heart and the lungs and thus pulling loose the lungs from the cavities in which these, at both sides of the spine, are housed.

This known eviscerating device has several disadvantages. One cannot always prevent that the projections provided on the brace bottom create unwanted damages at the entrails or other parts of the slaughtered poultry. Moreover, it occurs frequently that the loosened lungs or other parts of the entrails package fall through the legs of the U-shaped brace and are draped across the brace bottom. As a result loosening the entrails package from the eviscerating device, after the eviscerating device together with the entrails package has been removed from the poultry, is substantially hindered.

OBJECTS AND SUMMARY OF THE INVENTION

It is an object of the invention to provide an eviscerating device of the type referred to above in which the disadvantages of the known devices can be removed in a simple, but nevertheless effective way. Additional objects and advantages of the invention will be set forth in part in the following description, or may be obvious from the description, or may be learned through practice of the invention.

Thus, the eviscerating device according to the invention is characterized in that the legs and brace bottom comprise a rod with a smooth surface without projections, wherein at the brace bottom the rod is shaped such that it comprises, at the crest of the brace bottom, a bend projecting from the plane of the brace legs and having a shape adapted to the expected shape of the spine of the poultry to be processed.

Because the legs and the brace bottom, including the bend provided in the brace bottom, consist of a rod with a smooth surface without projections, the risk of unwanted damage of the slaughtered poultry or entrails removed therefrom is substantially decreased. Notwithstanding the smooth surface without projections, it surprisingly appears however that the eviscerating device can remove the entrails from the slaughtered poultry in an effective way. Especially, it appears that the bend, and more precisely the sections thereof engaging both sides of the spine and the transition thereof towards the remaining section of the brace bottom, is very effective in removing the lungs from their positions alongside the spine.

Of course the shape of the bend will be adapted to the expected average shape of the spine of the poultry to be processed, taking into account breed, age and weight of the poultry.

According to a preferred embodiment of the eviscerating means according to the invention, the brace bottom is mainly positioned in a plane enclosing a first angle with the plane of the brace legs, whereas the bend of the brace bottom is positioned in a plane enclosing a second, larger angle with the plane of the brace legs.

The advantage of this special embodiment is that, when the bend of the brace bottom engages the spine of the poultry in the desired way, the legs of the brace are sufficiently free from the back of the poultry or, in other words, that the plane of the bend may enclose a very large angle with the spine without a contact between the brace legs and the back of the poultry. Like this, the optimized position of the bend relative to the spine can be chosen for obtaining the best loosening action thereof.

Further, a special embodiment of the eviscerating device is mentioned according to which the brace bottom consists of two parallel first rod sections respectively joining the brace legs and two second rod sections extending between said first rod sections and the bend and running towards each other.

Due to this special construction of the eviscerating device, especially between the transition between the first rod sections and the second rod sections as it were, respective supporting planes are realized upon which the entrails, especially the lungs, will rest after being loosened without falling down across the brace bottom at the side facing away from the spine. Thus it can be avoided that the entrails are draped across the brace bottom and could only be removed from the eviscerating device with difficulty after the eviscerating device together with the entrails were removed from the slaughtered poultry.

Hereinafter the invention will be elucidated referring to the drawing in which an embodiment of the eviscerating mean according to the invention is represented.

BRIEF DESCRIPTION OF THE DRAWINGS

FIG. 2 shows a top plan view of the eviscerating device;

FIG. 3 shows an elevational side view of the eviscerating device, and

FIG. 4 shows an elevational frontal view of the eviscerating device.

DETAILED DESCRIPTION OF THE PREFERRED EMBODIMENTS

Figure 1:
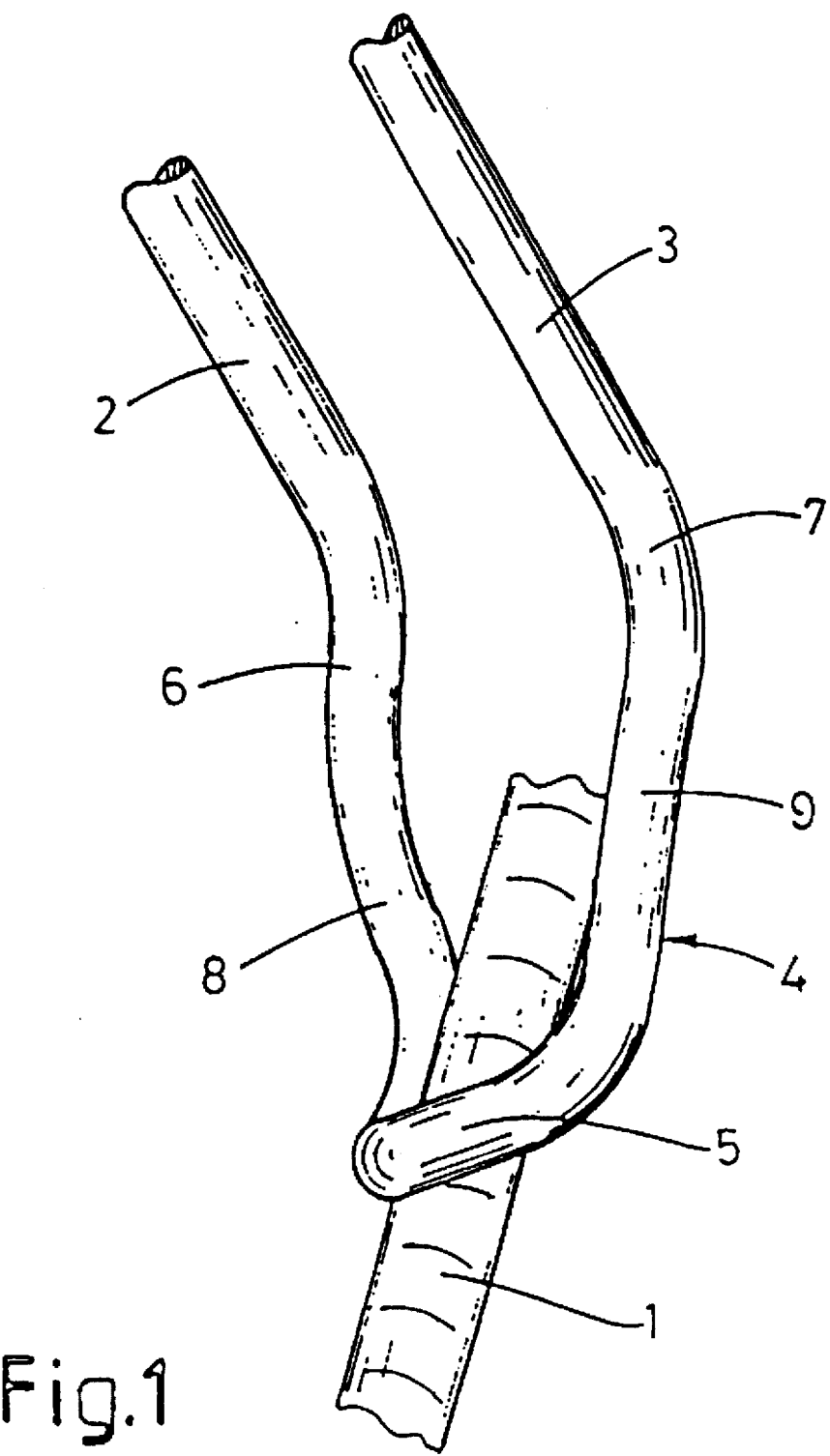
FIG. 1 shows perspectively an embodiment of the eviscerating device according to the invention in an operational position.

Reference will now be made to the presently preferred embodiment of the invention, one or more examples of which are illustrated in the drawings. Each example is provided by way of explanation of the invention, and not as a limitation of the invention. In fact, features illustrated or described as part of one embodiment can be used on another embodiment to yield a still further embodiment. Also, the numbering of components is consistent throughout the description and the drawings, with the same components having the same number throughout.

FIG. 1 shows perspectively an eviscerating device which is in an operational position within a slaughtered bird (not shown). The bird is in a conventional manner suspended with its legs from supporting hooks of a suspension conveyor (not shown). As illustrated, the eviscerating device engages the, only schematically indicated, spine 1 of the respective bird, as is usual for this type of eviscerating device.

The eviscerating device shown comprises a mainly U-shaped brace with two legs 2 and 3 extending in the same plane. These legs 2, 3 are interconnected by a brace bottom 4. In the illustrated embodiment, brace bottom 4 means that section of the U-shaped brace which is positioned outside the plane extending through the legs 2, 3.

As shown by FIG. 1, and as will appear also from FIG. 2 until 4, the entire brace, thus legs 2, 3 and brace bottom 4, consists of a rod with a smooth surface without projections. At the crest of the brace bottom 4, the rod is shaped such that a projecting bend 5 is shaped of which the shape is adapted to the shape of the spine 1 of the respective bird.

In this context, it is noted that there will not always be an exact correspondence between the shape of the bend 5 and the spine of an individual bird; rather the shape of the bend 5 will be adapted to the expected average shape of the spine, taking into account empirical facts based upon breed, age, or weight of the poultry to be processed.

Due to the chosen shape of the bend 5, it engages around the spine and can effectively loosen entrails sections present there, especially the lungs of the bird. The smooth surface of the U-shaped brace thereby prevents unwanted damages.

For a further explanation, the U-shaped brace illustrated in FIG. 1 is shown in three views in FIGS. 2 until 4.

As appears especially from FIG. 3, in the illustrated embodiment the brace bottom 4 (excluding the bend 5) is mainly positioned in a plane enclosing a first angle ∝ with the plane of the brace legs 2, 3. At its turn the bend 5 of the brace bottom appears to be positioned in a plane enclosing a larger angle B with the plane of the brace legs. As a result, as appears from FIG. 1, it is possible that, when the bend 5 encloses the spine 1 in the desired manner, the legs 2, 3 are still sufficiently directed away from the back of the poultry to be processed.

Further, a comparison between FIG. 2, 3 and 4 teaches that the brace bottom comprises two parallel first rod sections 6, 7 respectively joining the brace legs 2, 3 and two second rod sections 8, 9 extending between said first rod sections 6, 7 and the bend 5 and running towards each other. Especially due to the transitional areas between these first rod sections 6 and 7, respectively, and rod sections 8 and 9, respectively, supporting planes for the entrails are created when the eviscerating device is removed from the internal cavity of the respective bird. Thus, one can prevent that the entrails are fully draped between the legs 2, 3 of the U-shaped brace and across the brace bottom 4 (thus are moved to the left between the legs 2, 3 starting from the spine).

The invention is not limited to the embodiment described above which can be varied widely within the scope of the invention as defined by the claims. In fact, it will be apparent to these skilled in the art that various modifications and variations can be made in the invention without departing from the scope and spirit of the invention. It is intended that the present invention cover such modifications and variations as come within the scope of the appended claims and their equivalents.

I claim:

1. An eviscerating device for removing the entrails from slaughtered poultry, said device configured for entering into the body cavity of slaughtered poultry suspended from their legs and is moved upwardly and out of the internal cavity along the spine of the poultry such that the entrails are removed from the poultry, said device comprising:

a substantially U-shaped brace having two leg members extending in a plane;

a brace bottom connecting said leg members, said brace bottom comprising diverging rod sections defined in a plane forming a first angle with a plane extending through said leg members;

said leg members and brace bottom formed from a rod member having a relatively smooth surface;

said brace bottom further comprising a crest portion having a bend configured to partially surround the spine of the poultry, said bend defined in plane forming a second angle with said plane extending through said leg members, which is greater than said first angle.

2. The device as in claim 1, wherein said brace bottom further comprises first generally parallel rod sections extending from said leg members that merge into said diverging rod sections, said parallel and diverging rod sections defined in a plane forming said first angle with said plane extending through said leg members.

3. The device as in claim 2, wherein said crest portion is formed from a rod member connecting said diverging rod sections and forming an angle with said plane through said diverging rod sections.

4. The device as in claim 1, wherein said device is formed from a continuous rod member having a substantially uniform cross section therealong.

* * * * *